United States Patent [19]

Beier

[11] 4,112,783

[45] Sep. 12, 1978

[54] EXHAUST GAS RETURN VALVE ACTUATING ROD

[75] Inventor: Alfred Beier, Braunschweig-Hondelage, Fed. Rep. of Germany

[73] Assignee: Volkswagenwerk Aktiengesellschaft, Fed. Rep. of Germany

[21] Appl. No.: 777,893

[22] Filed: Mar. 16, 1977

[30] Foreign Application Priority Data

Mar. 31, 1976 [DE] Fed. Rep. of Germany ....... 2613781

[51] Int. Cl.$^2$ ........................... G05G 1/00; F16B 7/10

[52] U.S. Cl. ........................................ 74/470; 74/582; 123/119 A

[58] Field of Search ................. 74/470, 513, 582, 586; 123/119 A; 403/104, 109, 166, 393

[56] References Cited

U.S. PATENT DOCUMENTS

| | | | |
|---|---|---|---|
| 1,172,574 | 2/1916 | White | 74/582 |
| 2,158,572 | 5/1939 | Curtis | 123/106 X |
| 2,559,135 | 7/1951 | Townley | 74/470 X |
| 3,188,878 | 6/1965 | Chelminski | 74/470 |
| 3,241,394 | 3/1966 | Rubenstein | 74/470 X |
| 3,308,678 | 3/1967 | Walker | 74/470 |
| 3,989,018 | 11/1976 | Beier | 123/119 A |
| 4,018,098 | 4/1977 | Beier | 74/470 |

*Primary Examiner*—N. P. Godici
*Attorney, Agent, or Firm*—Brumbaugh, Graves, Donohue & Raymond

[57] ABSTRACT

An exhaust gas return valve actuating rod has first and second rod portions adapted for connection between an exhaust gas control valve and throttle linkage. The rods are interconnected by an eccentric connecting element which is spring connected to one of the rods and connected by a thread connection to the other rod. The eccentric connecting element enables convenient length adjustment of the connecting rod, even when it cannot be seen by the mechanic.

4 Claims, 2 Drawing Figures

EXHAUST GAS RETURN VALVE ACTUATING ROD

BACKGROUND OF THE INVENTION

This invention relates to exhaust gas control valves for use in an automobile engine, and particularly to actuating rods for connecting such control valves to the throttle linkage of the engine.

The inventor's prior U.S. Pat. No. 3,989,018, which is incorporated herein by reference, discloses an exhaust gas control valve which is interconnected with an engine throttle by an actuating rod. Such a control valve is useful for reducing nitrous oxide emissions in motor vehicles. When a portion of the engine exhaust gas is supplied to the engine intake manifold, the inert characteristics of the exhaust gas tend to reduce peak combustion temperatures in the engine. Reduced peak combustion temperatures results in a lower level of undesired nitrous oxide emissions.

As indicated in U.S. Pat. No. 3,989,018, it is desired that the portion of exhaust gases supplied to the intake manifold be varied in accordance with the throttle setting. The exhaust gas return valve has a closed position when the engine is idling, opens as the throttle is advanced and then closes again at full throttle against a stop. In order to permit full throttle actuation after the exhaust gas valve reaches its stop position, it is necessary to provide for resilient expansion of the actuating rod interconnecting the throttle with the exhaust gas valve. Resilient connection is also desirable in the event that the exhaust gas return valve becomes jammed on account of icing or contamination from exhaust gas deposits. By providing a resilient spring in the force transmitting direction of the actuating rod, it is possible to operate the throttle of the engine while the valve is jammed in a closed position.

The prior patent discloses an actuating rod which provides resilient interconnection of the exhaust gas control valve and the throttle. The rod therein disclosed includes first and second rod portions which are in force transmitting interconnection by use of a spring. The first rod portion has a tubular section which is arranged coaxially around the second rod portion. The spring is arranged surrounding the tubular section. There is additionally provided an adjusting nut, functioning as a turnbuckle, which is useful for adjusting the length of the actuating rod and therefore the setting of the exhaust gas control valve.

The actuating rod described in U.S. Pat. No. 3,989,018, while being fully functional for its intended purpose, is rather expensive to manufacture in large quantities for use on automobiles. The inventor's prior U.S. Pat. No. 4,018,098, granted on Apr. 19, 1977 discloses a less expensive actuating rod which is fabricated from a pair of rods, one of which is bent to form a loop surrounding the other.

While both of these prior actuating rods are useful for connecting control valves to the engine throttle linkage, they both contain a hexagonal adjusting nut for modifying the total length of the actuating rod. The use of a hexagonal nut makes it difficult to ascertain the position of the adjusting mechanism. This is particularly true when the actuating rod is located in an awkward or difficult to view position on the vehicle engine.

It is an object of the present invention to provide a new and improved actuating rod which may be easily adjusted without the need to view the rod during the adjustment process.

It is a further object of the invention to provide such a rod which is inexpensive to manufacture in large quantities.

SUMMARY OF THE INVENTION

In accordance with the present invention, there is provided an exhaust gas control valve actuating rod which includes a first rod portion adapted for connection to an exhaust gas control valve, and a second rod portion adapted for connection to a throttle linkage. A connecting element is arranged between the first and second rod portions, which are axially aligned. The connecting element is connected to one rod portion by a rod connection and connected to the remaining rod portion by a spring connection. The connecting element extends eccentrically with respect to the axis of the first and second rod portions.

The connecting rod element of the invention may be easily constructed with a U-shaped element having arms extending perpendicular to the axis of the rod portions. One arm of the U-shaped element may include a threaded insert with a locking thread for connection to one of the rod portions. The other arm of the U-shaped member may be rididly fastened to a tubular member surrounding one of the rod portions and the spring connection. One end of the tubular member may be provided with a collar for acting on the spring and guiding the rod portion.

The connecting element may be fabricated from a metal bar, bent to form first and second U-shaped elements. The arms of the second U-shaped element may be provided with bores surrounding one of the rod portions and maintaining the spring connection.

For a better understanding of the present invention, together with other and further objects, reference is made to the following description, taken in conjunction with the accompanying drawings, and its scope will be pointed out in the appended claims.

DESCRIPTION OF THE INVENTION

Figure 1:
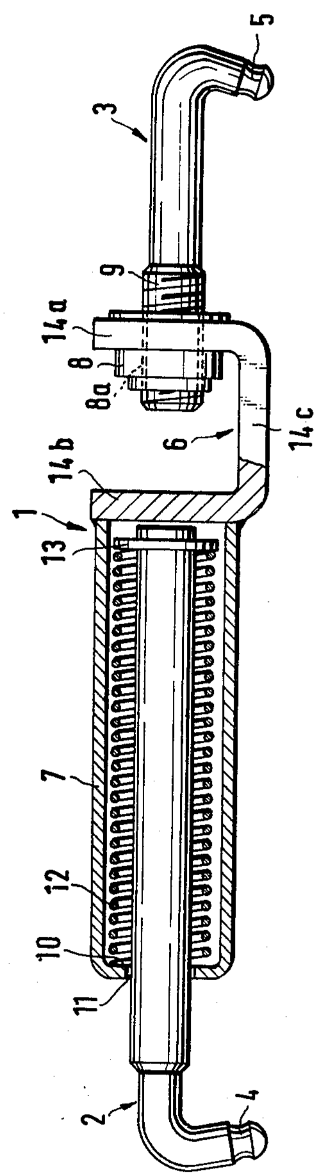
FIG. 1 shows an actuating rod in accordance with the present invention.

FIG. 1 shows an actuating rod in accordance with the invention which is designed for interconnecting an exhaust gas control valve and an engine throttle linkage. The acutating rod includes a first rod portion 2 which is provided with a connecting end 4 and a second rod portion 3 provided with a similar connecting end 5. Connecting ends 4 and 5 are adapted for connection to an exhaust gas control valve or the throttle linkage of an automobile in the manner illustrated in U.S. Pat. No. 3,989,018. It should be recognized that either end of the actuating rod may be connected to the throttle linkage while the other end is connected to the exhaust gas control valve.

The actuating rod illustrated in FIG. 1 is provided with a connecting element 1 for connecting rod portions 2 and 3. Connecting element 1 includes U-shaped element 6 having two arms **14*a* and 14*b* extending perpendicular to the axis of rod portions 2 and 3. The base 14*c* of element 6 is parallel to the axis of rod portions 2** and 3, and extends eccentrically with respect to the axes of these rod portions.

Arm 14a of U-shaped element 6 is provided with a threaded insert 8 having self-locking threads 8a to provide a threaded connection to the threaded section 9 of rod portion 3. Arm 14b of element 6 is provided with tubular member 7 surrounding rod portion 2. The end section 10 of tubular member 7 extends perpendicular to the axis of rod portion 2 and contains a bore 11 through which rod portion 2 can move axially. Perpendicular end section 10 forms a collar to retain one end of helical spring 12, while the other end of spring 12 is held by ring 13 which is connected to rod portion 2.

Tubular member 7 surrounding spring 12 provides a beneficial protection of the moving parts of the actuating rod in an automobile environment, since the tubular member 7 prevents dust, water, and ice from entering the portion of the actuating rod around spring 12.

U-shaped eccentric connecting element 6 provides a convenient adjusting mechanism for changing the total length of the actuating rod. In accordance with the invention, a mechanic can easily determine the starting point of a rod adjustment by grasping the eccentric portion and thereby determining its angular position. Manual rotation of the eccentric portion can effect the required adjustment. The number of turns of adjustment which have been made can easily be determined by reason of the eccentric shape of connecting element 6. This enables adjustment of the actuating rod even when the rod is located in an inaccessible area adjacent the vehicle engine which can be reached by hand, but cannot be easily seen.

In order to produce the actuating rod illustrated in FIG. 1, it is necessary to weld tubular member 7 to U-shaped element 6 after spring element 12 and ring 13 have been installed on rod portion 2. It is then necessary to compress spring 12 so that it is not adjacent to the connection between tubular member 7 and element 6 while a weld is being made, so that damage to spring 12 by reason of the heat used in the welding process is avoided.

Figure 2:
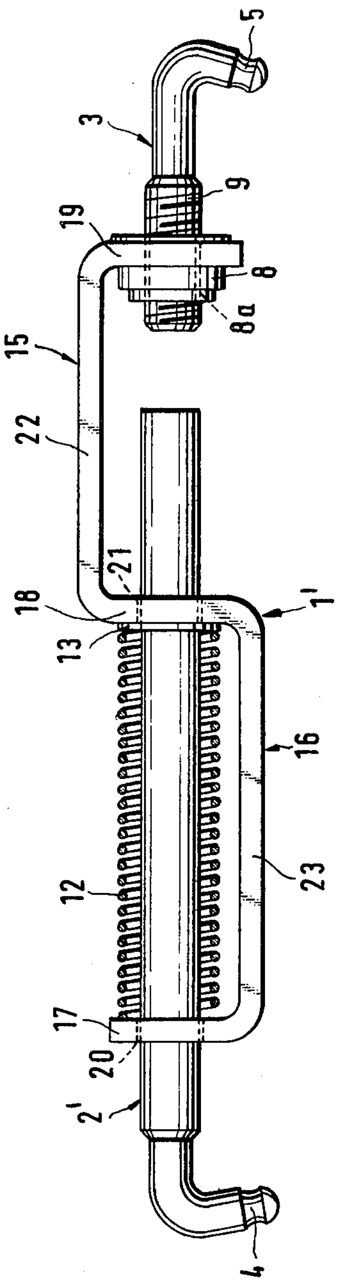
FIG. 2 is an alternate embodiment of an actuating rod in accordance with the present invention.

The FIG. 1 embodiment has especially short construction, and is therefore most useful where a relatively small distance exists between the throttle valve and the exhaust gas control valve. The embodiment illustrated in FIG. 2 is less expensive to construct, but has a larger overall length, and is therefore more useful where a greater distance is available between the throttle and the exhaust gas control valve. In the FIG. 2 embodiment, a connecting element 1' is fabricated using a single flat bar of metal, which is bent into an S-shape, thereby providing two connected U-shaped sections 15 and 16. The first U-shaped section 15 has one arm 19 extending perpendicular to the axis of rod portions 2' and 3 and is connected to rod portion 3 by a threaded connection identical to that used in the FIG. 1 embodiment. The second arm 18 of U-shaped section 15 is also perpendicular to rod portions 2' and 3 and is provided with a bore 21 surrounding rod portion 2'. Arm 18 of U-shaped section 15 also forms an arm of U-shaped section 16. The second arm 17 of U-shaped section 16 is also perpendicular to the axis of rod portions 2' and 3 and is provided with a bore 20 through which rod portion 2 extends. Spring 12 is maintained between arm 17 and ring 13. Connecting member 1' has two eccentric portions comprising bases 22 and 23 of U-shaped sections 15 and 16.

The principle advantage gained by the FIG. 2 embodiment is that the connecting member 1' of the actuating rod may be easily fabricated from a single piece of bar stock without the need for welding. Adjustment of the throttle length of the actuating rod of FIG. 2 may be effected in the same way as the FIG. 1 actuating rod, by rotation with reference to the position of one of the eccentric members 22 and 23.

Either the FIG. 1 or FIG. 2 actuating rods may be used in an exhaust gas control system of the type described in U.S. Pat. No. 3,989,018. The spring interconnection between one rod portion and the connecting element provides an elastic coupling of the throttle valve to the exhaust gas valve. Under normal conditions, spring 12 remains in the position illustrated and the throttle valve actuates the exhaust gas valve. In the event, the exhaust gas valve reaches its full position or becomes jammed, spring 12 enables the continued operation of the engine throttle with a small increase in spring force resulting from compression of spring 12.

While there have been described what are believed to be the preferred embodiments of the present invention, those skilled in the art will recognize that other and further modifications may be made thereto without departing from the true spirit of the invention, and it is intended to cover all such embodiments which fall within the true scope of the invention.

I claim:

1. An exhaust gas control valve actuating rod comprising a first rod portion adapted for connection to an exhaust gas control valve, a second rod portion axially aligned with said first rod portion and adapted for connection to a throttle linkage, and a connecting element, including a U-shaped section having arms extending perpendicular to the axis of said first and second rod portions, one of said arms having a threaded insert having a self-locking thread into which one of said rod portions is threaded for changing the length of said actuating rod, and the other of said arms being connected to the remaining rod portion by a spring connection, said connecting element extending eccentrically with respect to the axis of said first and second rod portions.

2. An actuating rod as specified in claim 1 wherein said connecting element comprises a bar bent into an S-shape, thereby forming two U-shaped sections, the arms of one of said U-shaped sections being provided with bores surrounding one of said rod portions and retaining said spring connection.

3. An acutating rod as specified in claim 2 wherein said spring connection comprises a helical spring surrounding one of said rod portions and maintained between a retaining ring on said rod portion and one of the arms of said S-shaped member.

4. An exhaust gas control valve actuating rod comprising a first rod portion adapted for connection to an exhaust gas control valve, a second rod portion axially aligned with said first rod portion and adapted for connection to a throttle linkage, and a connecting element, including a U-shaped section having arms extending perpendicular to the axis of said first and second rod portions, one of said arms being connected to one of said rod portions by a threaded connection for changing the length of said actuating rod, and the other of said arms being connected to the remaining rod portion by a spring connection, said connecting element extending eccentrically with respect to the axis of said first and second rod portions, and said other arm having a tubular element surrounding said remaining rod portion and surrounding and retaining said spring connection, said spring connection including a helical spring maintained between a restraining ring on said rod portion and a collor on said tubular member.

* * * * *